US010298343B2

(12) United States Patent
Dolezilek et al.

(10) Patent No.: US 10,298,343 B2
(45) Date of Patent: May 21, 2019

(54) SYSTEMS AND METHODS FOR TIME-SYNCHRONIZED COMMUNICATION

(71) Applicant: Schweitzer Engineering Laboratories, Inc., Pullman, WA (US)

(72) Inventors: David J. Dolezilek, Pullman, WA (US); Jorge Fernando Calero, Coral Springs, FL (US); Amandeep Singh Kalra, Bothell, WA (US); Brian T. Waldron, College Place, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 4 days.

(21) Appl. No.: 15/448,812

(22) Filed: Mar. 3, 2017

(65) Prior Publication Data
US 2018/0254994 A1 Sep. 6, 2018

(51) Int. Cl.
*H04J 3/06* (2006.01)
*H04L 12/28* (2006.01)

(52) U.S. Cl.
CPC ........ *H04J 3/0658* (2013.01); *H04L 12/2816* (2013.01)

(58) Field of Classification Search
CPC ... H02H 1/0061; H02H 7/261; H04L 67/2842
See application file for complete search history.

(56) References Cited

U.S. PATENT DOCUMENTS

| 6,633,823 | B2 | 10/2003 | Bartone |
| 7,283,916 | B2 | 10/2007 | Cahill-O'Brien |
| 7,715,887 | B2 | 5/2010 | Cloutier |
| 8,190,381 | B2 | 5/2012 | Spanier |
| 8,331,855 | B2 | 12/2012 | Williams |
| 9,351,193 | B2 * | 5/2016 | Raleigh .................. G06Q 20/40 |

(Continued)

OTHER PUBLICATIONS

Seeley, Nicholas C: Automation at Protection Speeds: IEC 61850 GOOSE Messaging as a Reliable, High-Speed Alternative to Serial Communications, 10th Annual Western Power Delivery Automation Conference, Apr. 8-10, 2008.

(Continued)

*Primary Examiner* — Asad M Nawaz
*Assistant Examiner* — Berhanu D Belete
(74) *Attorney, Agent, or Firm* — Jared L. Cherry; Richard M. Edge

(57) ABSTRACT

The present disclosure pertains to systems and methods for publishing time-synchronized information. In one embodiment, a system may include a time interface configured to receive a common time signal and a network interface configured to transmit a plurality of data packets using a network. A publishing subsystem may be configured to cause the system to publish at least one data value according to a schedule and the common time signal. A processing sequence number subsystem may be configured to generate a processing sequence number to be included in the plurality of data packets and to reset the processing sequence number at a fixed interval based on the common time signal. A data packet subsystem may be configured to generate a plurality of data packets comprising a respective processing sequence number and the at least one data value.

6 Claims, 6 Drawing Sheets

(56) References Cited

U.S. PATENT DOCUMENTS

| | | | |
|---|---|---|---|
| 2002/0071421 A1* | 6/2002 | Chiu | H04L 1/1809 370/349 |
| 2004/0162642 A1 | 8/2004 | Gasper | |
| 2008/0071482 A1* | 3/2008 | Zweigle | G01R 19/2513 702/62 |
| 2009/0070447 A1 | 3/2009 | Jubinville | |
| 2009/0088990 A1* | 4/2009 | Schweitzer, III | G01R 19/2513 702/58 |
| 2009/0112375 A1 | 4/2009 | Popescu | |
| 2010/0222094 A1 | 9/2010 | Usuda | |
| 2011/0035076 A1 | 2/2011 | Schweitzer | |
| 2011/0069709 A1* | 3/2011 | Morris | H04L 47/527 370/394 |
| 2011/0269490 A1* | 11/2011 | Earnshaw | H04L 1/0026 455/509 |
| 2013/0031201 A1 | 1/2013 | Kagan | |
| 2013/0142336 A1* | 6/2013 | Fries | H04L 9/0825 380/278 |
| 2014/0025321 A1* | 1/2014 | Spanier | G01R 21/133 702/62 |
| 2014/0068711 A1 | 3/2014 | Schweitzer | |
| 2014/0164640 A1* | 6/2014 | Ye | H04L 47/12 709/235 |
| 2014/0164641 A1* | 6/2014 | Ye | H04L 47/127 709/235 |
| 2014/0269736 A1* | 9/2014 | Kasztenny | H04L 45/30 370/400 |
| 2014/0280673 A1* | 9/2014 | Dolezilek | H02H 7/261 709/213 |
| 2015/0311714 A1 | 10/2015 | Dolezilek | |
| 2017/0078922 A1* | 3/2017 | Raleigh | H04W 28/10 |

OTHER PUBLICATIONS

Dolezilek, David: IEC 61850 GOOSE and IEEE C37.118 Synchrophasors Used for Wide-Area Monitoring and Control, SPS, RAS, and Load and Generation Management, 2nd International Conference Monitoring of Power System Dynamics Perfornamce, Saint Petersburg, Russia, Apr. 28-30, 2008.

Analog Devices: A System Solution for IEDs Based on IEC 61850, 2013.

\* cited by examiner

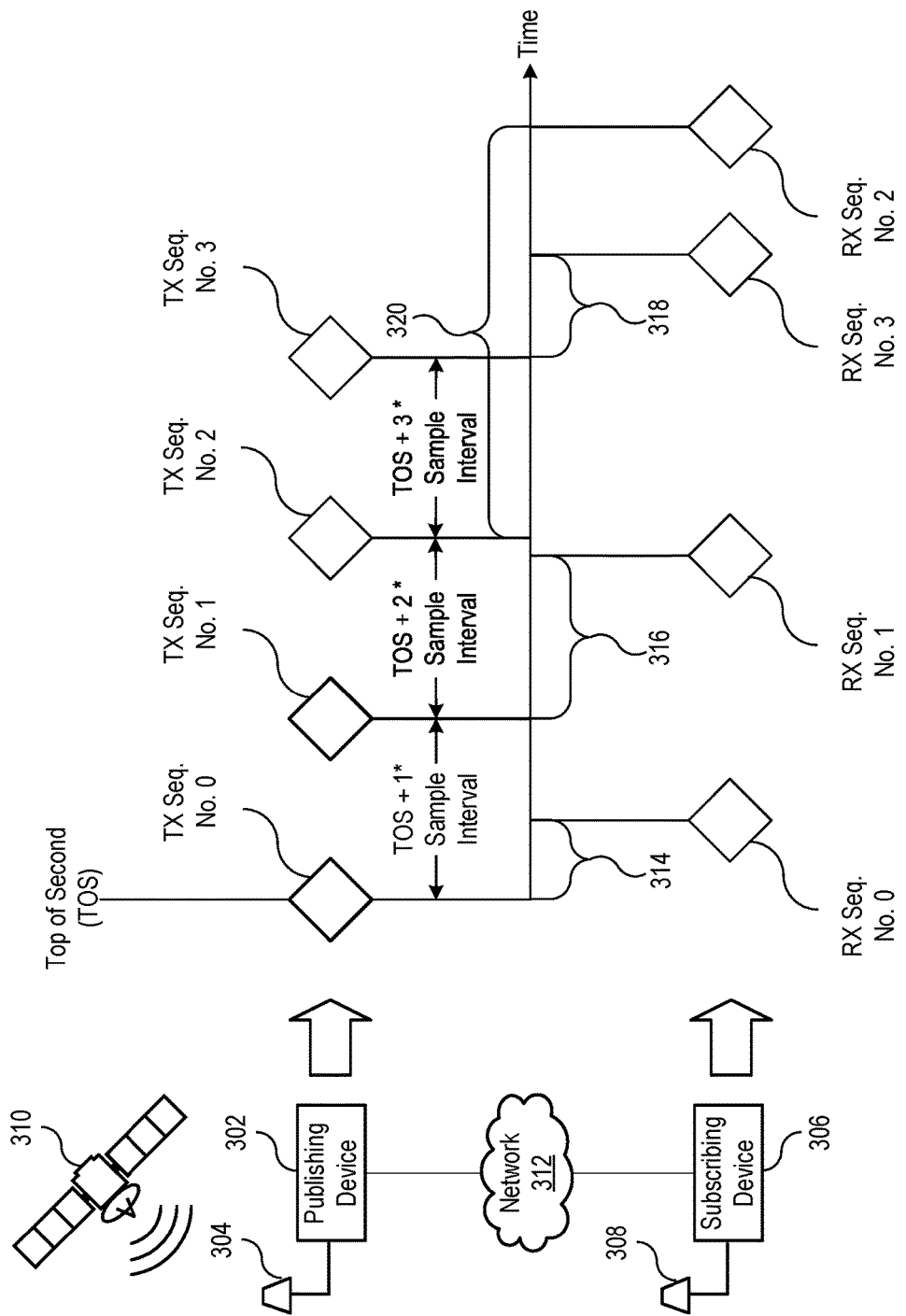

SYSTEMS AND METHODS FOR TIME-SYNCHRONIZED COMMUNICATION

TECHNICAL FIELD

This disclosure relates to systems and methods for synchronizing delivery of digital information. More particularly, but not exclusively, the techniques disclosed in the present application may be used to communicate information in electrical power systems.

BRIEF DESCRIPTION OF THE DRAWINGS

Non-limiting and non-exhaustive embodiments of the disclosure are described, including various embodiments of the disclosure with reference to the figures, in which:

FIG. 3 illustrates a flow chart of a method for managing communication between devices in an electric power generation and delivery system consistent with embodiments disclosed herein.

DETAILED DESCRIPTION

Figure 1:
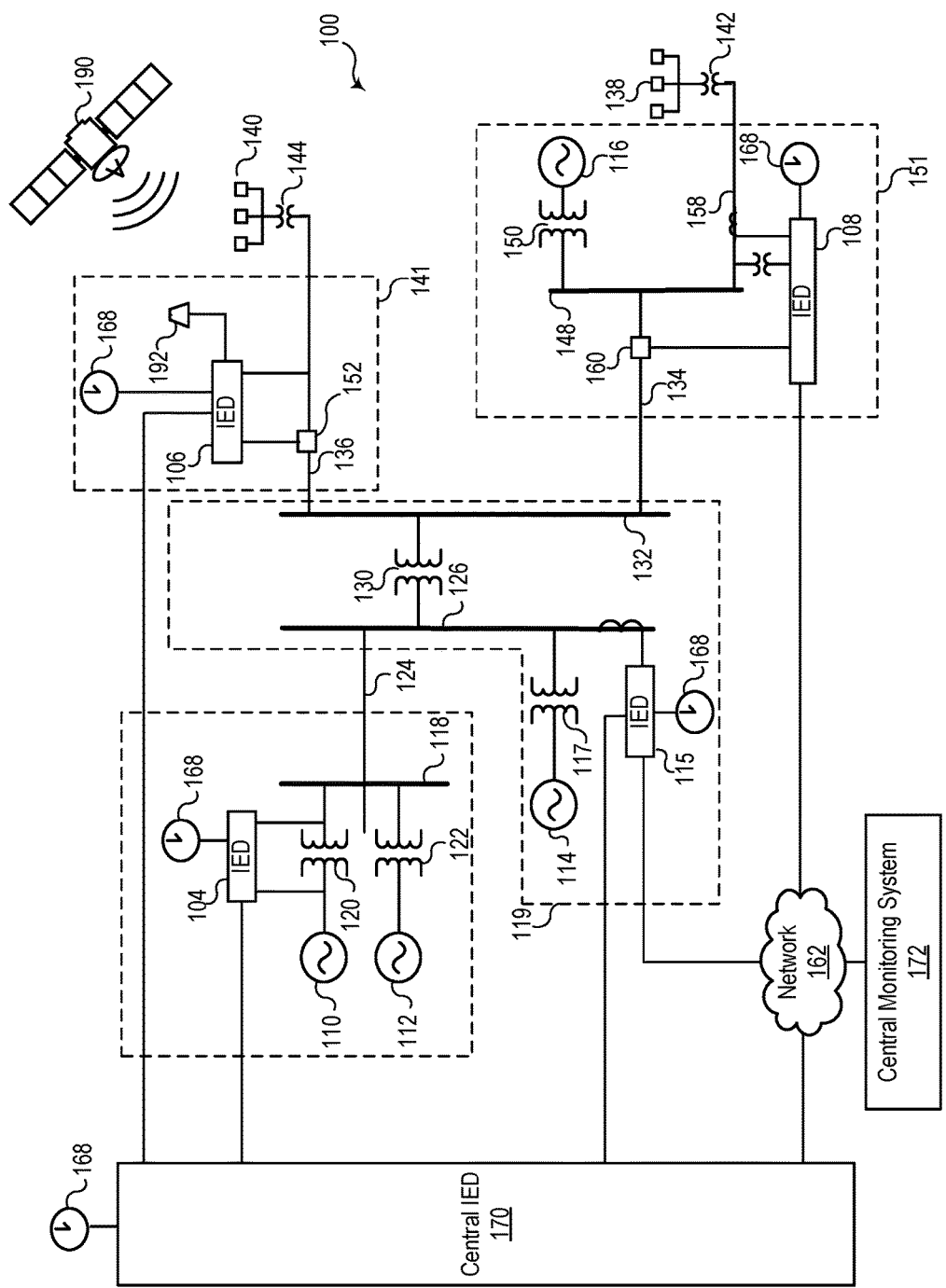
FIG. 1 illustrates an example of an embodiment of a simplified one-line diagram of an electric power delivery system with various substations consistent with embodiments of the present disclosure.

Various embodiments consistent with the present disclosure pertain to delivery of low-latency, time-synchronized measurements utilizing standard network communication protocols. In various embodiments consistent with the present disclosure, the IEC 61850 GOOSE (Generic Object Oriented Substation Events) format may be used. In various embodiments, a plurality of devices may be configured to utilize a common external time reference to publish information regarding electrical conditions at a plurality of locations in an electrical power system. By synchronizing the publication of the messages, a subscribing device may be able to synchronize measurements from the plurality of locations. The publication of data according to a fixed schedule may allow a subscribing device to determine the time of the measurement and to synchronize measurements from different locations without regard to variation in latency. Although several specifically described embodiments specifically refer to GOOSE messages, other communication protocols are also contemplated. For example, SV (Sampled Values), MMS (Manufacturing Messaging Specification), MirroredBits®, and other message formats may be utilized.

Certain embodiments may be configured to utilize a processing sequence number to synchronize messages. The processing sequence number may be reset by publishing devices based on the external common time signal. In one specific embodiment, the processing sequence number may be reset at the top of each second (i.e., at the beginning of each second) according to the external common time signal. A relatively short period of time (e.g., 1 second) for resetting the processing sequence number ensures that the processing sequence numbers can be represented using only a small amount of data. Further, resetting the processing sequence number at a fixed interval effectively causes all of the publishing devices to be frequently resynchronized, thus reducing or eliminating the possibility for significant drift. In some embodiments, the processing sequence number may be included in a data payload, while in other embodiments, the processing sequence number may be a portion of a message header.

The embodiments of the disclosure will be best understood by reference to the drawings. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor do the steps need be executed only once, unless otherwise specified.

In some cases, well-known features, structures, or operations are not shown or described in detail. Furthermore, the described features, structures, or operations may be combined in any suitable manner in one or more embodiments. It will also be readily understood that the components of the embodiments, as generally described and illustrated in the figures herein, could be arranged and designed in a wide variety of different configurations. For example, throughout this specification, any reference to "one embodiment," "an embodiment," or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Several aspects of the embodiments disclosed herein may be implemented as software modules or components. As used herein, a software module or component may include any type of computer instruction or computer executable code located within a memory device that is operable in conjunction with appropriate hardware to implement the programmed instructions. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory machine-readable medium having stored thereon instructions that may be used to program a computer or other electronic device to perform processes described herein. The non-transitory machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions. In some embodiments, the computer or other electronic device may include a processing device such as a microprocessor, microcontroller, logic circuitry, or the like. The processing device may further include one or more special purpose processing devices such as an application specific interface circuit (ASIC), PAL, PLA, PLD, field programmable gate array (FPGA), or any other customizable or programmable device.

Electrical power generation and delivery systems are designed to generate, transmit, and distribute electrical energy to loads. Electrical power generation and delivery systems may include equipment, such as electrical generators, electrical motors, power transformers, power transmission and distribution lines, circuit breakers, switches, buses, transmission lines, voltage regulators, capacitor banks, and the like. Such equipment may be monitored, controlled, automated, and/or protected using intelligent electronic devices (IEDs) that receive electric power system information from the equipment, make decisions based on the information, and provide monitoring, control, protection, and/or automation outputs to the equipment.

In some embodiments, an IED may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communication processors, computing platforms, programmable logic controllers (PLCs), programmable automation controllers, input and output modules, governors, exciters, statcom controllers, static VAR compensator (SVC) controllers, on-load tap changer (OLTC) controllers, and the like. Further, in some embodiments, IEDs may be communicatively connected via a network that includes, for example, multiplexers, routers, hubs, gateways, firewalls, and/or switches to facilitate communications on the networks, each of which may also function as an IED. Networking and communication devices may also be integrated into an IED and/or be in communication with an IED. As used herein, an IED may include a single discrete IED or a system of multiple IEDs operating together.

High-accuracy time sources may be utilized in a variety of applications, such as telecommunications, aerospace, automation, electric power generation and distribution, radar, scientific applications, etc. A variety of systems, protocols, and/or techniques may be utilized to synchronize devices and/or to permit multiple devices to utilize a common high-accuracy time source. For example, a high-accuracy time signal may be received using an Inter-Range Instrumentation Group (IRIG) protocol, a global navigation satellite system (GNSS) (e.g., global positioning system (GPS), GLONASS, the Galileo Satellite System), a radio broadcast such as a National Institute of Science and Technology (NIST) broadcast (e.g., radio stations WWV, WWVB, and WWVH), the IEEE 1588 protocol, a network time protocol (NTP) codified in RFC 1305, a simple network time protocol (SNTP) in RFC 2030, and/or another time transmission protocol or system.

FIG. 1 illustrates a simplified one-line diagram of an electric power transmission and distribution system 100 configured to utilize one or more secondary time sources to verify the accuracy of a primary time source consistent with embodiments of the present disclosure. Electric power delivery system 100 may be configured to generate, transmit, and distribute electric energy to loads. Electric power delivery systems may include equipment, such as electric generators (e.g., generators 110, 112, 114, and 116), power transformers (e.g., transformers 117, 120, 122, 130, 142, 144 and 150), power transmission and delivery lines (e.g., lines 124, 134, 136, and 158), circuit breakers (e.g., breakers 152, 160), busses (e.g., busses 118, 126, 132, and 148), loads (e.g., loads 140, and 138) and the like. A variety of other types of equipment may also be included in electric power delivery system 100, such as voltage regulators, capacitor banks, and a variety of other types of equipment.

Substation 119 may include a generator 114, which may be a distributed generator, and which may be connected to bus 126 through step-up transformer 117. Bus 126 may be connected to a distribution bus 132 via a step-down transformer 130. Various distribution lines 136 and 134 may be connected to distribution bus 132. Distribution line 136 may lead to substation 141 where the line is monitored and/or controlled using IED 106, which may selectively open and close breaker 152. Load 140 may be fed from distribution line 136. Further step-down transformer 144 in communication with distribution bus 132 via distribution line 136 may be used to step down a voltage for consumption by load 140.

Distribution line 134 may lead to substation 151, and deliver electric power to bus 148. Bus 148 may also receive electric power from distributed generator 116 via transformer 150. Distribution line 158 may deliver electric power from bus 148 to load 138, and may include further step-down transformer 142. Circuit breaker 160 may be used to selectively connect bus 148 to distribution line 134. IED 108 may be used to monitor and/or control circuit breaker 160 as well as distribution line 158.

Electric power delivery system 100 may be monitored, controlled, automated, and/or protected using intelligent electronic devices (IEDs), such as IEDs 104, 106, 108, 115, and 170, and a central monitoring system 172. In general, IEDs in an electric power generation and transmission system may be used for protection, control, automation, and/or monitoring of equipment in the system. For example, IEDs may be used to monitor equipment of many types, including electric transmission lines, electric distribution lines, current transformers, busses, switches, circuit breakers, reclosers, transformers, autotransformers, tap changers, voltage regulators, capacitor banks, generators, motors, pumps, compressors, valves, and a variety of other types of monitored equipment.

As used herein, an IED (such as IEDs 104, 106, 108, 115, and 170) may refer to any microprocessor-based device that monitors, controls, automates, and/or protects monitored equipment within system 100. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system comprising multiple IEDs.

Central monitoring system 172 may comprise one or more of a variety of types of systems. For example, central monitoring system 172 may include a supervisory control and data acquisition (SCADA) system and/or a wide area control and situational awareness (WACSA) system. A central IED 170 may be in communication with IEDs 104, 106, 108, and 115. IEDs 104, 106, 108 and 115 may be remote from the central IED 170, and may communicate over various media such as a direct communication from IED 106 or over a wide-area communications network 162. According to various embodiments, certain IEDs may be in direct communication with other IEDs (e.g., IED 104 is in direct communication with central IED 170) or may be in communication via a communication network 162 (e.g., IED 108 is in communication with central IED 170 via communication network 162).

In various embodiments, IEDs 104, 106, 108, 115, and 170 may be configured to monitor the frequency of alternating current waveforms, voltage levels, or other electrical conditions in system 100. Network 162 may be used to transmit information among various components in system 100, including IEDs 108, 115, 170, and central monitoring system 172. In various embodiments, network 162 may be configured to provide streaming measurements that may be analyzed consistent with the present disclosure to detect anomalies.

A common time signal may be used to time-align measurements for comparison and/or to synchronize action across system 100. Utilizing a common or universal time source may ensure that IEDs have a synchronized time signal that can be used to generate time synchronized data, such as synchrophasors. In various embodiments, the common time source may comprise a time signal from a GNSS system 190. IED 106 may include a receiver 192 configured to receive the time signal from the GNSS system 190. In various embodiments, IED 106 may be configured to distribute the time signal to other components in system 100, such as IEDs 104, 108, 115, and 170.

IED 106 may also receive a time signal from time source 168. In various embodiments, time source 168 may be either an internal time source or an external time source. The time signal from the GNSS system 190 may be the primary time source, while the time source 168 may represent a secondary time source that is used to verify the primary time source and/or may be used when the primary time source is unavailable.

As described in greater detail below, one or more of IEDs 104, 106, 108, and 115 may utilize a time signal received from GNSS system 190 and/or time source 168 to publish information relating to electrical conditions in system 100 according to a predetermined schedule. In various embodiments, measurements from IEDs 104, 106, 108 and/or 115 may be communicated to central IED 170 and/or central monitoring system 172. The information may be utilized to control the operation of components in system 100.

Figure 2:
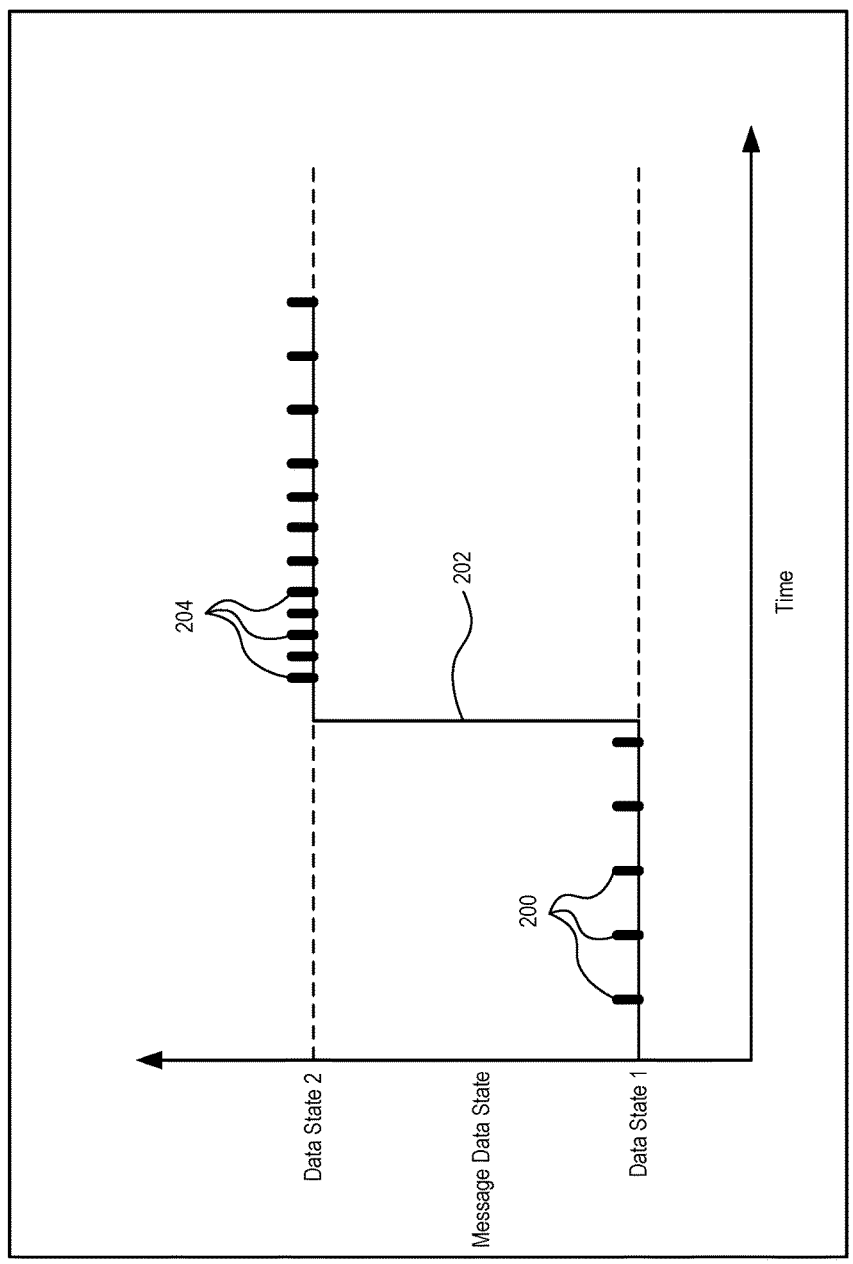
FIG. 2 illustrates an exemplary timing diagram showing transmission of messages by an intelligent electronic device prior to and after a data state change consistent with embodiments disclosed herein.

FIG. 2 illustrates an exemplary timing diagram showing transmission of messages 200, 204 by an IED consistent with embodiments disclosed herein. In the illustrated embodiment, the timing diagram may be embodied using the GOOSE protocol, in which publication of messages is driven by a change in a data state. A message may include one or more control instructions, monitored system data, communications with other IEDs, monitored equipment and/or other network devices, and/or any other relevant communication, message, or data.

A message may further indicate not only a particular data state, but also whether the message indicates a data state that is different than a data state indicated by one or more preceding message. That is, a message may include an indication that data associated with the message represents a data state change from a prior message. In certain embodiments, the prior message may be an immediately preceding message. In certain embodiments, data state change information may be indicated by a data state change indicator (DSCI) included in the message. For example, a DSCI included in a message may be set to "1" following a first state change event. Accordingly to some embodiments, the DSCI may be asserted in only a first message following a state change event. In other embodiments, the DSCI may be asserted for a specified period of time or for a specified number of messages. The DSCI may be set to a different value upon a subsequent data state change event. By utilizing a DSCI, a receiving device may determine that a particular message indicates a recent state change without having to examine certain contents (e.g., state information) of the message and/or previously received messages.

In certain embodiments, an IED may transmit to subscribing devices and/or receive from publishing (e.g., transmitting) devices messages 200 reflecting a particular data state (e.g., "Data State 1") at periodic intervals at a first communication rate after a certain period in which the state has remained constant. For example, if a measured data state has not changed recently, an IED may transmit messages 200 at periodic intervals at the first communication rate. Transmission of similar data state messages periodically may introduce a degree of redundancy, helping to ensure that subscribing devices receive messages during periods of network congestion and/or low network bandwidth conditions.

When a data state change occurs (e.g., at 202), the IED may publish and/or receive messages 204 reflecting the changed state (e.g., "Data State 2") at periodic intervals having a second communication rate. As illustrated, in certain embodiments, the second communication rate may be faster than the first communication rate. Accordingly, the period between sequential messages 204 may be shorter than the period between sequential messages 200. As time progresses following the data state change event 202, the communication rate of the messages 204 may progressively slow to reach, for example, a rate at or near the first communication rate. In this manner, state messages may be transmitted at a relatively fast rate immediately following a data state change event 202 that progressively slows as the data state change event 202 becomes older. According to some embodiments, the transmission rate may decrease exponentially for a period of time following the data state change event 202.

Data state changes may be generated based on a schedule. In embodiments utilizing GOOSE messages, the publishing devices may be configured to publish information based on a state change, and accordingly, publication of information may occur according to the schedule. In some embodiments, publication of data may be associated with a change of a binary trigger value. The change of the value of the binary trigger may cause a GOOSE device to recognize a change of state, and accordingly, to publish information according to the schedule.

In some embodiments, the binary trigger value may be associated with a processing sequence number that may be used to synchronize data packets. The sequence value may be associated with logic that causes the sequence value to update according to a schedule and to reset at a specified schedule (e.g., at the top of each second). Using this mechanism, the IED was configured to calculate and publish instantaneous power magnitudes at a fixed frequency regardless of whether or not power values changed. The sequence value may remain unchanged when a state change is associated with a change unrelated to the schedule. As such, the same publishing device may simultaneously publish information according to a schedule consistent with the present disclosure and may also publish information based on other state changes (e.g., tripping of a breaker).

The schedule according to which the data is published and the time delay between messages 202, 204 may be configurable based on an application and/or physical parameters of a communication channel. For example, applications utilizing a lower bandwidth communication channel may be configured with a longer delay between messages. A configurable minimum and maximum time delay between messages and/or adjustment of the schedule may be used to ensure that the resulting data meets the design requirements, while ensuring that the resulting data traffic does not overwhelm the communication channel.

The ability to adjust the rate of publication may provide additional flexibility in comparison to other communication protocols. For example, according to IEEE C37.118.2-2011, it is mandatory that phasor-measurement units (PMUs) support data reporting at submultiples of the nominal powerline system frequency. Higher rates are encouraged but not mandatory and are, therefore, manufacturer-specific. Required publication rates are documented for both 50 Hz and 60 Hz systems as the number of messages, or frames, per second. The IEEE C37.118.2-2011 standard requires that that PMUs support 10, 25, and 50 messages per second in 50 Hz systems; and requires that PMUs support 10, 12, 15, 20, 30, and 60 messages per second in 60 Hz systems. Accordingly, the fastest standardized data interval in a 50 Hz system is 20 ms, and in a 60 Hz system is 16.67 ms. This speed may not be sufficient for some applications. Systems and methods consistent with the present disclosure may enable a user-selectable publication rate. For example, a system consistent with the current disclosure may be configured to publish data every operating cycle (i.e., every 2.5 ms on a 50 Hz system).

FIG. 3 illustrates a conceptual representation of a series of messages transmitted by a publishing device 302 through a network 312 and received by a subscribing device 306 consistent with embodiments of the present disclosure. The publishing device 302 and the subscribing device 306 may each be in communication with a GNSS receiver 304, 308, respectively. The GNSS receivers 304, 308 may receive a common time signal from a GNSS 310. The publishing device may begin transmitting a series of messages at the top of a second (TOS) based on the common time signal received from GNSS 310. The first message in the sequence may include a processing sequence number of 0, and the processing sequence number may increment in each successive message. The processing sequence number may reset at the top of the next second.

A new message may be published at a sample interval. The specific time at which each message is published may be determined by the subscribing device using the processing sequence number, the sample interval, and the TOS. Specifically, the time of publication of each message may be determined by both the publishing device 302 and the subscribing device 306 using Eq. 1.

$$TX\ Time\ of\ Message = TOS + Seq.\ No * Sample\ Interval \quad \text{Eq. 1}$$

As illustrated in FIG. 3, the latency associated with the transmission of messages through the network 312 may vary, and messages are not guaranteed to be received in the same order in which they are transmitted. The varying latency values 314, 316, 318, and 320 are shown in the timing diagram of FIG. 3. Further, in the specifically illustrated scenario in FIG. 3, the message associated with sequence no. 3 is received by the subscribing device 306 after the message associated with sequence no. 2.

In spite of the varying latency associated with the network 312, the receiving device may utilize the common time signal and the processing sequence numbers in the messages to determine the time of transmission of each message. Using this information, the subscribing device 306 may be able to synchronize the messages from the publishing device 302 without including a time stamp in each message.

Other time-synchronized protocols may incorporate absolute time stamp within the messages. The time stamp may represent a relatively large amount of time and analysis of the time stamp. For example, the IEEE C37.118.2 or synchrophasor protocol includes timestamp values called seconds of century (SOC) and fraction of second (FRACSEC). SOC is the count of seconds from midnight of Jan. 1, 1970, until the message was created. This SOC value has a range of 136 years, is constantly growing larger, and will roll over in the year 2106. FRACSEC provides fractional second and time quality information when divided by the time base value. Although the SOC+FRACSEC quantity permits a subscribing device to align messages from multiple sources to a similar point in time, this approach may require greater communication bandwidth and greater computational power in comparison to the bandwidth and processing requirements associated with use of a small processing sequence number, as disclosed herein.

In various embodiments consistent with the present disclosure, the time of transmission of a message may be determined solely using the processing sequence number and the previous time at which the processing sequence number was reset. In other words, the messages may omit absolute time references.

Figure 4A:
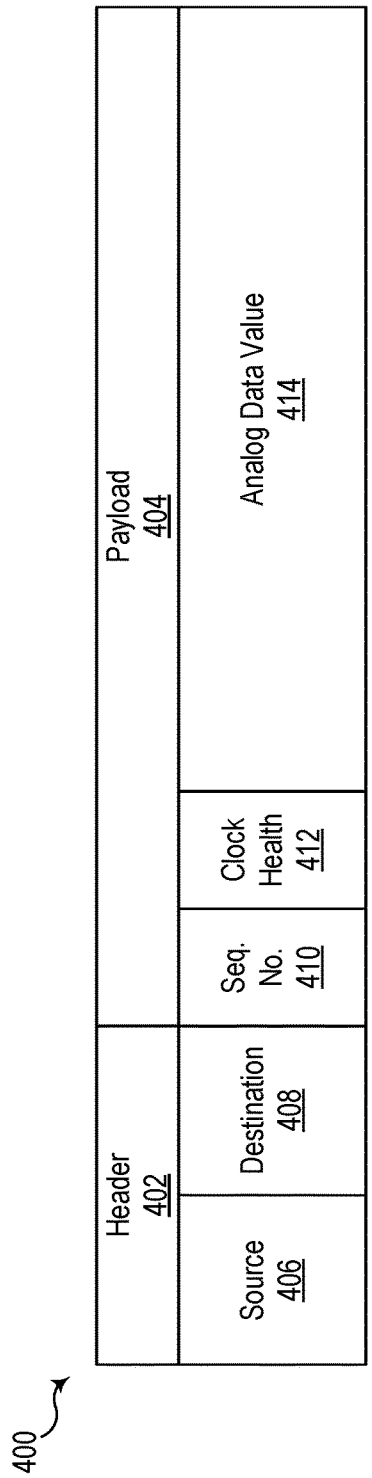
FIG. 4A illustrates a conceptual representation of a data packet including a processing sequence number in a data payload consistent with embodiments of the present disclosure.

FIG. 4A illustrates a conceptual representation of a data packet including a processing sequence number in a data payload consistent with embodiments of the present disclosure. In the illustrated embodiment, the message 400 includes a header 402 and a payload 404. The header 402 includes information regarding the source 406 of the message 400 and the destination 408.

The payload 404 may include a processing sequence number 410 associated with a data value. As described above in connection with Eq. 1, the sequence value may be used to determine a time that the message 400 is transmitted. The sequence value may further be used to ensure receipt of a series of messages. The payload 404 may also include a clock health value 412 configured to indicate whether the publishing device is in communication with a common time source. If the publishing device is not in communication with the common time signal, or if the common time signal does not satisfy various performance metrics, subscribing devices may selectively discard messages and/or trigger an alarm condition. An analog data value 414 may be included in the payload. In other embodiments, multiple data values or various types (e.g., digital values) may be included in the payload 404. In GOOSE messages, 7 bytes may be used to encode floating-point values.

Figure 4B:
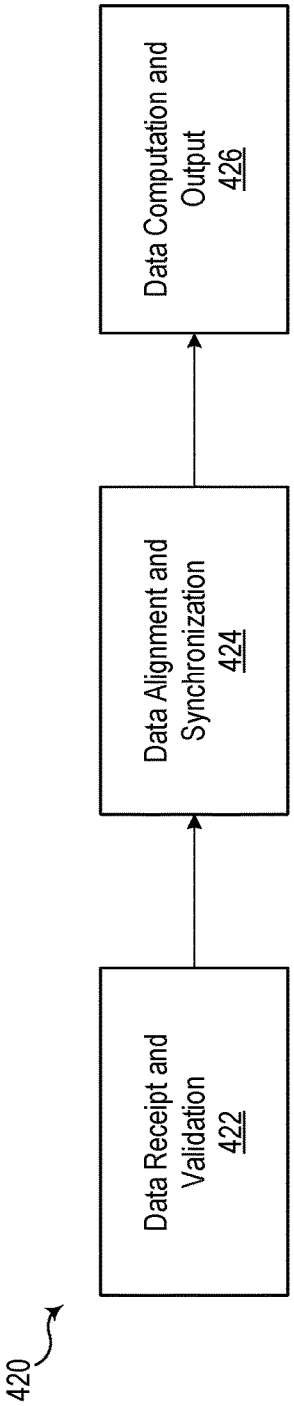
FIG. 4B illustrates a simplified flow chart of a method 420 for synchronizing and processing a plurality of data packets in the format illustrated in FIG. 4A and consistent with embodiments of the present disclosure.

FIG. 4B illustrates a simplified flow chart of a method 420 for synchronizing and processing a plurality of data packets in the format illustrated in FIG. 4A and consistent with embodiments of the present disclosure. At 422, method 420 may confirm data receipt and validation. The receipt and validation may ensure that all messages in a particular sequence are received. At 424, the data may be aligned and synchronized using the processing sequence number. In particular, each data packet may be ordered according to its processing sequence number. Finally, at 426, a system configured to utilize the data may perform computations using the data and output a result.

In one specific application, the systems and methods disclosed herein may be used to calculate power flows within an electric power system. In one specific application, the system may be used to receive power values at a plurality of locations and to transmit such values to a control system configured to maintain the stability of the system. In such an embodiment, each point may be configured to make a power calculation according to the schedule and to transfer the resulting power calculation to the other stations and/or controllers in the system. Such a system may be configured to achieve transmission and determination of appropriate control actions within 50 ms using the techniques described in *New Deterministic, High-Speed, Wide-Area Analog Synchronized Data Acquisition—Creating Opportunities for Previously Unachievable Control Strategies*, presented by the inventors of the present application at the Power and Energy Automation Conference in Spokane, Wash., on Mar. 8-10, 2016, which is incorporated herein by reference.

Figure 5:
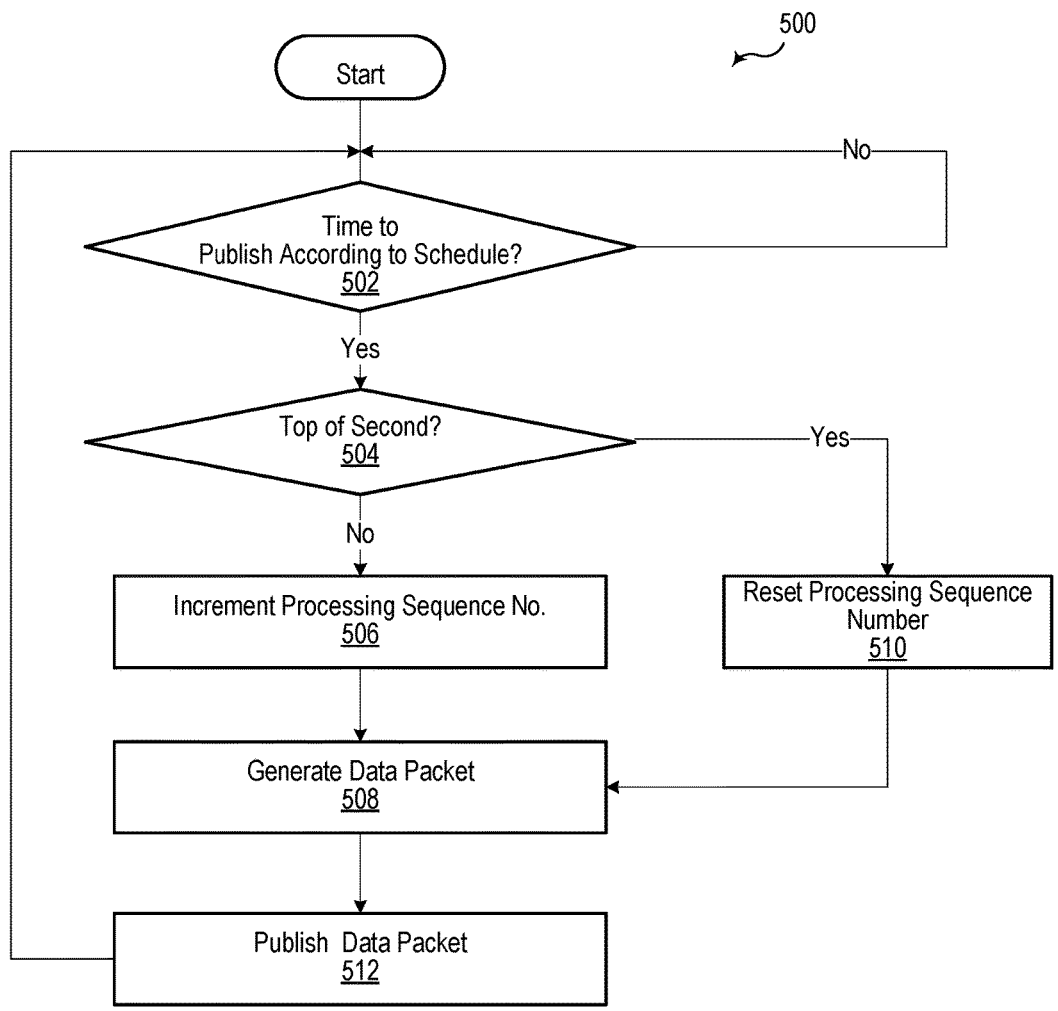
FIG. 5 illustrates a flow chart of a method for publishing data consistent with embodiments of the present disclosure.

FIG. 5 illustrates a flow chart of a method 500 for publishing data consistent with embodiments of the present disclosure. At 502, method 500 may determine whether data should be published according to a schedule. The determination may be based on a common time source accessible to a device configured to receive the published data. Upon a determination that it is time to publish data according to the schedule, method 500 may determine whether the publication corresponds to the top of a second. If the publication corresponds to the top of a second, the processing sequence number may be reset at 510. In other embodiments, the processing sequence number may be reset at intervals other than the top of the second. The interval may be greater than every second (e.g., every minute, every hour, etc.), or may be less than every second (e.g., every 500 milliseconds, every 100 milliseconds, etc.).

At 506, a processing sequence number may be incremented. As discussed above, a processing sequence number may be included in each message in a message stream to confirm receipt of data, align, and synchronize a plurality of data packets in the message stream. The processing sequence number may represent a small value that imposes a minimal computational burden on a receiving system. By periodically resetting the sequence value using a common time signal, a publishing device implementing method 500 may avoid drift with respect to other devices that receive the common time signal.

At 508, a data packet may be generated. The data packet may include the processing sequence number and one or more data values. In one specific embodiment, the data packet may be formatted as shown in FIG. 4A. At 512, the data packet may be published. In some embodiments, the data packet may be published through an Ethernet network. In other embodiments, the data packet may be published using a wide variety of other types of networks.

FIG. 5 illustrates a flow chart of a method 500 for managing communication between devices in an electric power generation and delivery system consistent with embodiments disclosed herein. At 502, a message and an associated identifier may be received via a network and/or communication interface of a network device. In certain embodiments, the message may be a GOOSE message and the identifier may be a subscription identifier.

At 504, a determination may be made that the received message is the most recently received message (e.g., freshest) indicating a data state change associated with the identifier. In certain embodiments, this may involve examining a DSCI associated with and/or included in the message. In further embodiments, this may involve examining data state change information included in the message and/or previously received message to determine if a data state change has occurred. If the received message is the most recently received message indicating a data state change associated with the identifier, at 506, the message may be routed to a message buffer associated with the identifier. In certain embodiments, the message buffer may be a one-message buffer. In further embodiments, a determination may be made that the received message is the most recently received message (e.g., the freshest message) associated with the identifier. At 508, a determination may be made whether the message buffer associated with the identifier is full. If the buffer is full, at 510, the message buffer may be purged at least partially (e.g., emptied or erased). If the message buffer is not full, at 512 the message may be stored in the message buffer associated with the identifier. As discussed above, the message stored in the message buffer may then be placed in an output message queue based on, for example, a priority associated with the corresponding identifier, a relative time in which the message was received by the network device, or any other suitable queueing methodology. The message may then be transmitted by the network device to an associated IED from the output message queue.

Figure 6:
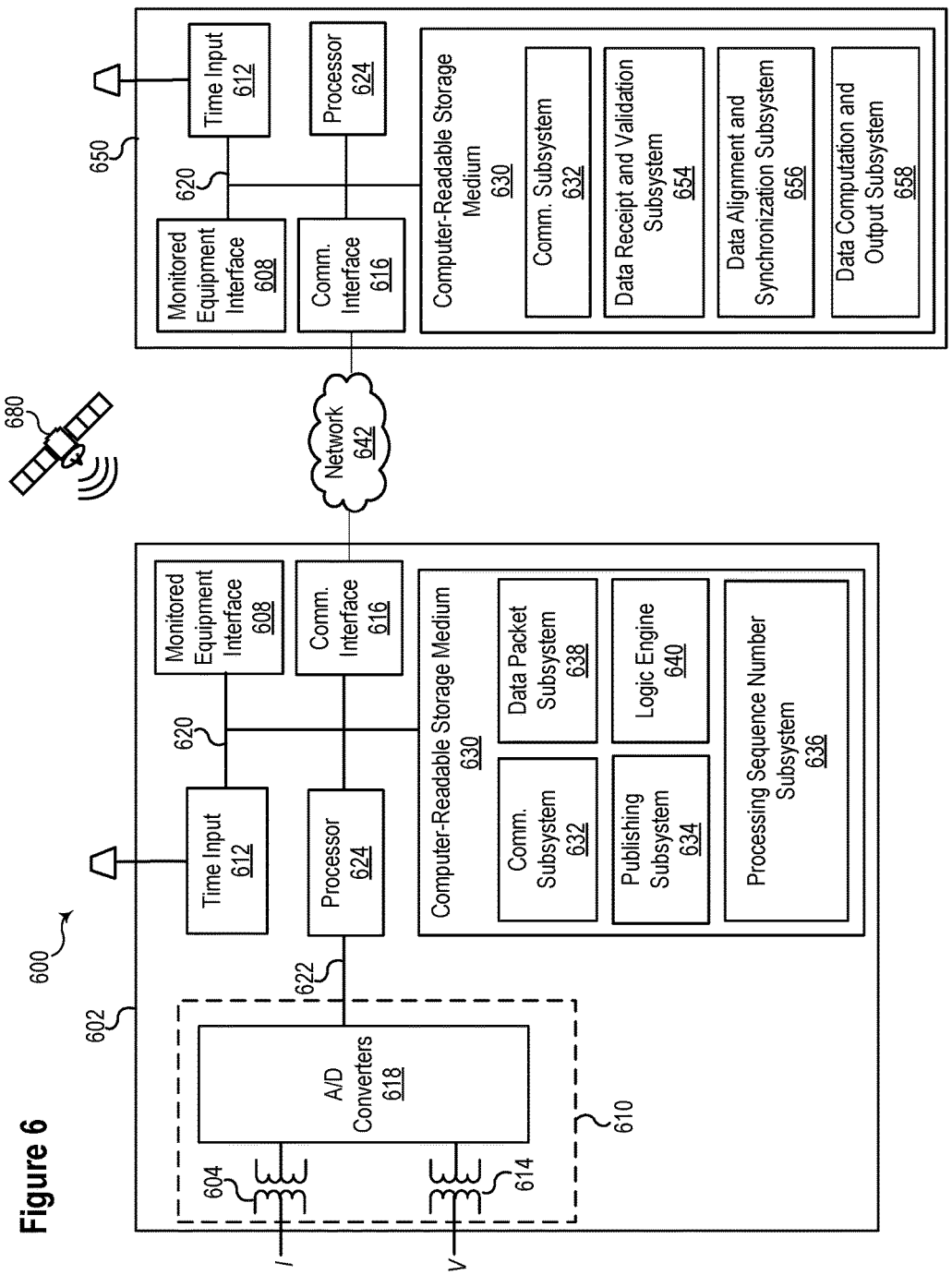
FIG. 6 illustrates a block diagram of a network device for implementing certain embodiments of the systems and methods disclosed herein.

FIG. 6 illustrates a functional block diagram of a system 600 comprising a publishing device 602 and a subscribing device 650 configured to exchange time-synchronized data through a network 642 consistent with embodiments of the present disclosure. In certain embodiments, the publishing device 602 and the receiving device may be embodied as IEDs configured to monitor and control an electric power distribution system. System 600 may be implemented using hardware, software, firmware, and/or any combination thereof. In some embodiments, system 600 may be embodied as an IED, while in other embodiments, certain components or functions described herein may be associated with other devices or performed by other devices. The specifically illustrated configuration is merely representative of one embodiment consistent with the present disclosure.

System 600 includes a communications interface 616 configured to communicate with devices and/or IEDs. In certain embodiments, the communications interface 616 may facilitate direct communication with other IEDs or communicate with systems over a communications network. Communications interface 616 may facilitate communications through a network.

System 600 may further include a time input 612, which may be used to receive a time signal (e.g., a common time reference) allowing system 600 to apply a time-stamp to the acquired samples. In the illustrated embodiment, a GNSS 680 may provide a common time signal used by publishing device 602. In other embodiments, a common time reference may be received via communications interface 616, and accordingly, a separate time input may not be required for time-stamping and/or synchronization operations. One such embodiment may employ the IEEE 1588 protocol.

Processor 624 may be configured to process communications received via communications interface 616, time input 612, and/or monitored equipment interface 608. Processor 624 may operate using any number of processing rates and architectures. Processor 624 may be configured to perform various algorithms and calculations described herein. Processor 624 may be embodied as a general purpose integrated circuit, an application specific integrated circuit, a field-programmable gate array, and/or any other suitable programmable logic device.

A monitored equipment interface 608 may be configured to receive status information from, and issue control instructions to, a piece of monitored equipment (such as a circuit breaker, conductor, transformer, or the like). In various embodiments, the monitored equipment interface may be configured to interface with a control system configured to monitor and control the transmission of electrical power through a plurality of transmission lines.

In certain embodiments, system 600 may include a sensor component 610. In the illustrated embodiment, sensor component 610 is configured to gather data directly from conventional electric power system equipment such as a conductor (not shown) using conventional PTs and/or CTs. The sensor component 610 may use, for example, transformers 604 and 614 and A/D converters 618 that may sample and/or digitize filtered waveforms to form corresponding digitized current and voltage signals provided to data bus 622. Current (I) and voltage (V) inputs may be secondary inputs from conventional instrument transformers such as, CTs and VTs. A/D converters 618 may include a single A/D converter or separate A/D converters for each incoming signal. A current signal may include separate current signals from each phase of a three-phase electric power system. A/D converters 618 may be connected to processor 624 by way of data bus 622, through which digitized representations of current and voltage signals may be transmitted to processor 624. In various embodiments, the digitized current and voltage signals may be used to calculate time-domain quantities for the detection and the location of a fault on an electric power system as described herein.

A computer-readable storage medium 630 may be the repository of various software modules configured to perform any of the methods described herein. A data bus 620 may link monitored equipment interface 608, time input 612, communications interface 616, and computer-readable storage medium 630 to processor 624.

Communications module 632 may be configured to allow system 600 to communicate with any of a variety of external devices via communications interface 616. Communications module 632 may be configured for communication using a variety of data communication protocols (e.g., UDP over Ethernet, IEC 61850, etc.). Communications module 632 may be configured to interpret communications received via communication interface 616 and/or to transmit information via communication interface 616.

Publishing module 634 may be configured to cause publishing device 602 to publish information according to a schedule based on the time signal. In certain embodiments the publishing module 634 may cause the publishing device to publish power system information at a rate that exceeds the rate supported by the IEEE C37.118.2. In one specific embodiment, the publication rate may be as low as around 2 ms, but may be scalable to satisfy the application or data channel.

Processing sequence number module 636 may be configured to generate a processing sequence number to be included in a plurality of data packets. The processing sequence numbers may be used by a subscribing device to confirm receipt of a plurality of data packets. Further, the processing sequence numbers may be used to align and synchronize the plurality of data packets. Further, the processing sequence number module 636 may be configured to reset the processing sequence number at a fixed interval based on the common time signal. In one specific embodiment, the fixed interval at which the processing sequence number is reset is equal to one second and occurs at the top of each second.

Data packet module 638 may be configured to generate a plurality of data packets comprising a respective processing sequence number and at least one data value. In one specific embodiment, the data packet module 638 may be configured to generate packets in the format illustrated in FIG. 4B. Other data formats may also be used in other embodiments. In some embodiments, data packet module 638 may further be configured to include in the data packet an indicator of a status of the common time signal. In one specific embodiment, the indicator of the status of the common time signal comprises a bit which is asserted when the publishing device 602 receives a high-quality time signal from the GNSS 680. The indicator may be deasserted during periods when the common time signal is unavailable or when the quality of the common time signal is not high or when the signal is not locked. In some embodiments the status of the common time signal is the synchronization of the publishing device 602 with the common time signal. The subscribing device 650 may receive and use the indicator of the status of the common time to determine utility of the information received. For example, the subscribing device 650 may discard information associated with an indicator of the status of the common time that synchronization was lost. In such an instance, the subscribing device 650 may seek a different source for the data.

In some embodiments, logic engine 640 may be configured to implement the schedule according to which information is published. In one specific embodiment, the logic engine may operate according to the IEC 61131 standard. GOOSE messages are published at a fixed rate when no data are changing and also immediately after a change is detected. This change can be the toggle of a binary status or an analog value passing through a reporting dead band. Logic according to the IED 61131 standard may toggle the value of an IED logic bit. This point may be added to the GOOSE payload, and as such, it may provoke a new GOOSE publication each time this logic bit is toggled. Using this mechanism, publishing device 602 may be configured to publish one or more quantities. Altering the frequency that the logic toggles the logic bit changes the frequency of the GOOSE publication.

The subscribing device 650 may include many of the same components as the publishing device 602. In addition, the subscribing device may include a data receipt and validation subsystem 654. The data receipt and validation subsystem 654 may be configured to confirm receipt of each of a plurality of messages based on a processing sequence number. The data receipt and validation subsystem 654 may ensure that a packet associated with each processing sequence number is received. Omission of any processing sequence number may be an indication of packet loss.

Data alignment and synchronization subsystem 656 may be configured to order each of a plurality of data packets. The data alignment and synchronization subsystem 656 may be configured to order the plurality of data packets based on the processing sequence numbers.

Data computation and output subsystem 658 may be configured to utilize the data included in the plurality of data packets to perform data computations. In some embodiments, the data may relate to electrical power systems. The data computation may further generate an output based on the data. In various embodiments, the output may comprise control instructions configured to adjust or reconfigure the electrical power system.

While specific embodiments and applications of the disclosure have been illustrated and described, it is to be understood that the disclosure is not limited to the specific configurations and components disclosed herein. Accordingly, many changes may be made to the details of the above-described embodiments without departing from the underlying principles of this disclosure. The scope of the present invention should, therefore, be determined only by the following claims.

What is claimed is:

1. A system for publishing time-synchronized information, comprising:
   a network;
   a publishing device, comprising:
      a first time interface in communication with a common time source to provide a common time signal to a processor of the publishing device;
      a first network interface in communication with a network to transmit a plurality of data packets using the network;
      a publishing subsystem comprising computer instructions that when executed by the processor of the publishing device cause the publishing device to publish at least one data value according to a schedule and the common time signal;
      a processing sequence number subsystem comprising computer instructions that when executed by the processor of the publishing device cause the publishing device to:
         generate a processing sequence number to be included in each of the plurality of data packets, and
         reset the processing sequence number at a fixed interval based on the common time signal; and
      a data packet subsystem comprising computer instructions that when executed by the processor of the publishing device cause the publishing device to generate a plurality of data packets comprising a respective processing sequence number and the at least one data value; and
   a subscribing device, comprising:
      a second time interface in communication with the common time source to provide a common time signal to a processor of the subscribing device;
      a second network interface in communication with the network to receive the plurality of data packets using the network;
      a data receipt and validation subsystem comprising computer instructions that when executed by the processor of the subscribing device cause the subscribing device to confirm receipt of the plurality of data packets based on the processing sequence number included in each of the plurality of data packets;
      a data alignment and synchronization subsystem comprising computer instructions that when executed by the processor of the subscribing device cause the subscribing device to order the plurality of data packets based on the processing sequence number included in each of the plurality of data packets; and
      a data computation subsystem comprising computer instructions that when executed by the processor of the subscribing device cause the subscribing device to implement a control action based on the at least one data value included in at least one of the plurality of data packets.

2. The system of claim 1, wherein each of the first time interface and the second time interface comprise a global navigation satellite system interface.

3. The system of claim 1, wherein the plurality of data packets comprise data packets formatted according to a GOOSE (Generic Object Oriented Substation Events) protocol.

4. The system of claim 3, wherein the publishing subsystem further comprises a logic engine comprising computer instructions that when executed by the processor of the publishing device cause the publishing device to modify a setting according to the schedule, the setting configured to cause publication of the at least one data value according to the GOOSE protocol.

5. The system of claim 1, wherein the fixed interval corresponds to a top of each second.

6. The system of claim 1, wherein the data alignment and synchronization subsystem comprises further computer instructions that when executed by the processor of the subscribing device cause the subscribing device to determine a time of transmission of each of the plurality of messages solely based on the processing sequence number and a previous time at which the processing sequence number was reset.

\* \* \* \* \*